(12) United States Patent
Durairaj et al.

(10) Patent No.: US 12,170,659 B1
(45) Date of Patent: Dec. 17, 2024

(54) MULTI-FACTOR AUTHENTICATION

(71) Applicant: UIPCO, LLC, San Antonio, TX (US)

(72) Inventors: Ravi Durairaj, San Antonio, TX (US); Robert Andrew Massie, San Antonio, TX (US); Christopher Edward Flores, San Antonio, TX (US); Phillip E Marks, San Antonio, TX (US); David Joaquin Harris, San Antonio, TX (US); Oscar Guerra, San Antonio, TX (US); Justin Royell Nash, Little Elm, TX (US); Pradeep Mangalagiri, Naperville, IL (US); Luis Eduardo Santana, Crowley, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 465 days.

(21) Appl. No.: 17/242,245

(22) Filed: Apr. 27, 2021

Related U.S. Application Data

(60) Provisional application No. 63/016,777, filed on Apr. 28, 2020.

(51) Int. Cl.
*H04L 9/40* (2022.01)
*G07C 9/00* (2020.01)
(Continued)

(52) U.S. Cl.
CPC ...... *H04L 63/0853* (2013.01); *G07C 9/00896* (2013.01); *H04L 63/0861* (2013.01);
(Continued)

(58) Field of Classification Search
CPC ............. H04L 63/0853; H04L 63/0861; H04L 63/0876; H04L 2463/082; H04W 12/63;
(Continued)

(56) References Cited

U.S. PATENT DOCUMENTS 10,063,542 B1 * 8/2018 Kao .................. G10L 17/06
10,665,244 B1 * 5/2020 Gupta ................ H04M 3/5166
(Continued)

*Primary Examiner* — Philip J Chea
*Assistant Examiner* — Ghizlane Maazouz
(74) *Attorney, Agent, or Firm* — Potomac Law Group, PLLC; Dannon G. Allbee

(57) ABSTRACT

A multi-factor authentication technique can use multiple smart devices to determine whether a person is authenticated by minimizing the extent to which the person is expected to interact with his or her smart devices. In an example multi-factor authentication method comprises performing a first determination, that a first mobile device is located within a wireless range of a device, obtaining a unique identifier from the first mobile device, sending, to a server, the unique identifier, receiving, from the server, information that indicates a first authentication technique and a second authentication technique, performing a second determination that the person is authenticated by successfully performing the first authentication technique with the first mobile device and by successfully performing the second authentication technique with the second mobile device, and performing a final authentication operation in response to performing the second determination.

20 Claims, 5 Drawing Sheets

(51) Int. Cl.
*G10L 17/22* (2013.01)
*H04B 1/3827* (2015.01)
*H04W 12/06* (2021.01)
*H04W 12/63* (2021.01)

(52) U.S. Cl.
CPC ......... *H04L 63/0876* (2013.01); *H04W 12/06* (2013.01); *H04W 12/63* (2021.01); *G07C 2009/00928* (2013.01); *G10L 17/22* (2013.01); *H04B 1/3827* (2013.01); *H04L 2463/082* (2013.01)

(58) Field of Classification Search
CPC ............... H04W 12/06; G07C 9/00896; G07C 2009/00928; G10L 17/22; H04B 1/3827
USPC .......................................................... 726/3
See application file for complete search history.

(56) References Cited

U.S. PATENT DOCUMENTS

| | | | |
|---|---|---|---|
| 2014/0129231 A1* | 5/2014 | Herring | G10L 25/51 704/270.1 |
| 2014/0283136 A1* | 9/2014 | Dougherty | H04W 64/00 726/29 |
| 2016/0371475 A1* | 12/2016 | Zhao | H04L 63/08 |
| 2018/0054261 A1* | 2/2018 | Ding | H04B 11/00 |
| 2018/0124233 A1* | 5/2018 | Abramson | H04W 12/30 |
| 2018/0126951 A1* | 5/2018 | Ricci | G08G 1/096725 |
| 2019/0242986 A1* | 8/2019 | Saban | G01S 15/74 |
| 2019/0289000 A1* | 9/2019 | Kao | H04L 63/0861 |
| 2019/0303556 A1* | 10/2019 | Jain | G06F 21/35 |
| 2020/0036709 A1* | 1/2020 | Mars | H04L 63/0853 |
| 2020/0134151 A1* | 4/2020 | Magi | G06F 21/35 |
| 2022/0392650 A1* | 12/2022 | Schweinfurth | G10L 17/00 |

* cited by examiner

MULTI-FACTOR AUTHENTICATION

CROSS-REFERENCE TO RELATED APPLICATION

This application is a non-provisional of and claims priority to U.S. Provisional Application No. 63/016,777, filed on Apr. 28, 2020, entitled "MULTI-FACTOR AUTHENTICATION," which is hereby incorporated by reference in its entirety for all purposes.

BACKGROUND

The prevalence of smart devices has changed the way people interact with technology and the way people operate their lives. Smart devices enable people to obtain relevant information and/or to control other devices. For example, a smart phone can provide directions to drive to a destination, a smart electronic watch can measure heart rate, and a radio frequency identification (RFID) device can send information to lock or unlock a door or to enable or disable a home alarm. The ability of smart devices to communicate with other devices can also enable smart devices to perform authentication with another device.

Figure 1:
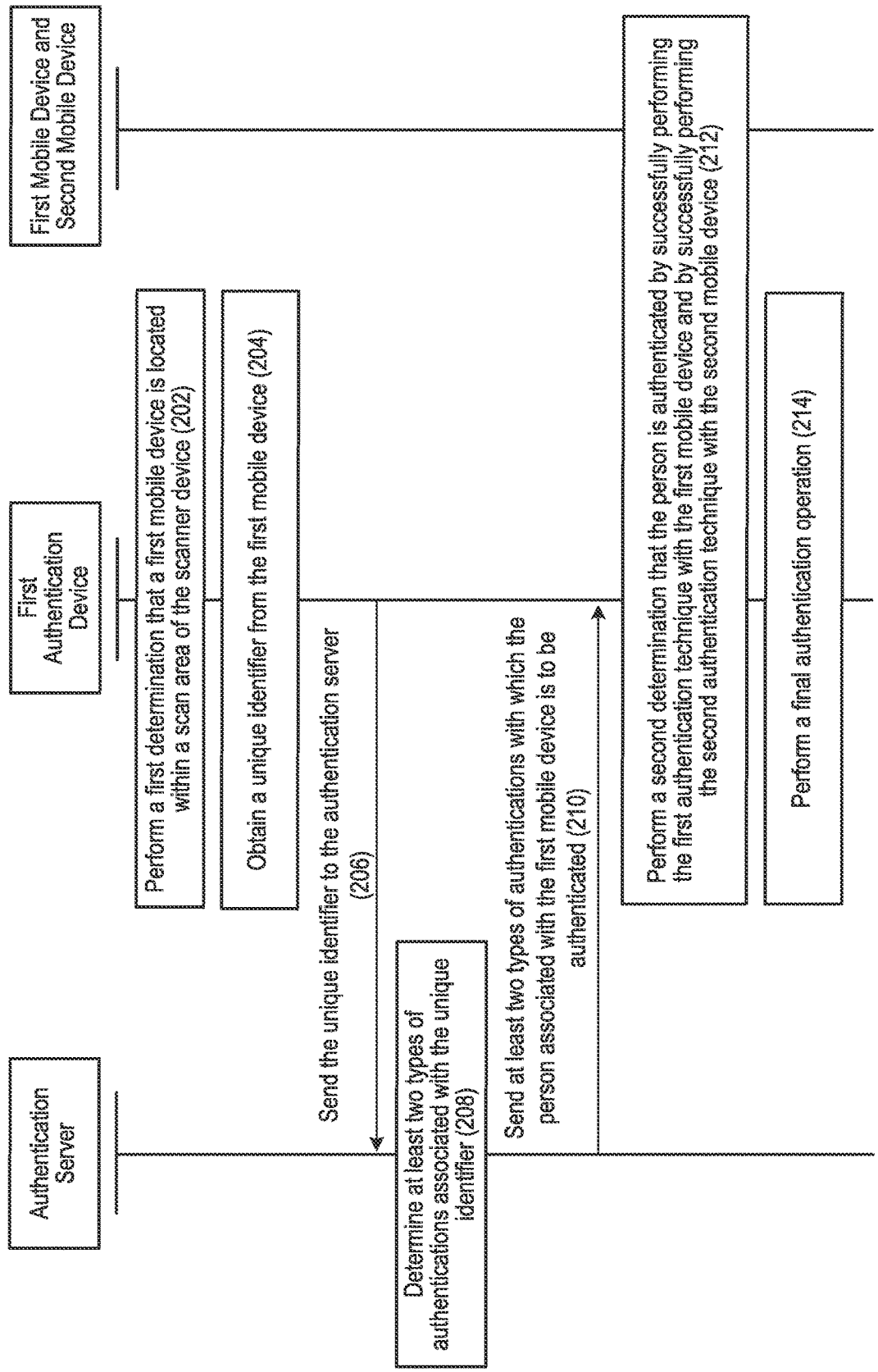
FIG. 1 shows an example flowchart of a multi-factor authentication technique using at least two smart devices associated with a person being authenticated.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Smart devices can perform authentication related operations at least because such devices tend to be carried by and/or worn by a person. However, current authentication technology does not adequately utilize the available smart devices associated with a person to perform authentication and/or current authentication technology does not enable full automated authentication in which a person does not have to interact with his or her smart devices to facilitate authentication. This patent document describes at least two example authentication techniques using multiple smart devices to determine whether a person is authenticated to perform an operation while minimizing the extent to which the person is expected to interact with his or her smart devices. Smart devices (also known as mobile devices) may include mobile phones, smart electronic watches, smart electronic glasses, tablets, laptop, RFID tags, and/or wearable devices (e.g., sensor located in jacket, etc.). When a person is authenticated, the authentication technology described in this patent document can facilitate operations such as displaying a message on a device where the message indicates that a person is authenticated, or causing a motor to lock/unlock an electronic lock, or causing a motor open/close a garage door.

In a first example of an authentication technique, a person carrying multiple smart devices approaches an area that includes one or more devices with which the multiple smart devices can communicate to authenticate the person. In one implementation, the area where the one or more devices is located may be a mobile booth setup to interact with existing customer so that the person visiting the mobile booth can be authenticated. Thus, for example, a first authentication device (e.g., computer) located in a mobile booth can include a scanner device (e.g., a camera or a wireless transceiver) with which the first authentication device can determine whether that a first mobile device (e.g., a smart phone or RFID tag) is located within a scan area (e.g., wireless transmission/reception area) of the scanner device.

If the first mobile device is determined to be present within the scan area of the scanner device, then the scanner device can wirelessly obtain an identifier from the first mobile device. The identifier may be an account identifier that can be used to identify an account associated with the person carrying the first mobile device. The first authentication device can send the identifier to a server (e.g., via the Internet) and can receive information that indicates a first authentication technique and a second authentication technique with which the person can be authenticated (e.g., use first authentication technique with a smart phone and use second authentication technique with a smart electronic watch or use first authentication technique with a RFID tag in shoe and use a second authentication technique with a RFID tag in an electronic card). For example, the first authentication device may send the identifier to an authentication server and the authentication server can determine whether an account exists for the identifier and whether information related to the first authentication technique and the second authentication technique were previously stored for the identifier or account. The authentication server can send information that indicates the first authentication technique and the second authentication technique so that the first authentication device may use the smart devices associated with the first and second authentication techniques to authenticate the person. In an example implementation, a first type of authentication may indicate that the person is to be authenticated using his or her smart phone and a second type of authentication may indicate that the person is to be authenticated using his or her smart electronic watch.

The multi-factor authentication techniques described in this patent document is technically advantageous at least because it enables maximum automation for authentication while minimizing the interaction between the person and his or her smart devices. Thus, for example, the first authentication device may include a stored table that includes authentication techniques to be performed for various types of authentication techniques. Using the example mentioned above, a stored table can indicate that for the first type of authentication, the first authentication device can send instructions to trigger the smart phone to play a first audio content, and the stored table can indicate that for the second type of authentication, the first authentication device can send instructions to trigger the smart electronic watch to play a second audio content. The first and the second audio contents can be played at one or more frequencies that may be imperceptible to the person (e.g., at frequency/frequencies greater than 20 kHz). Thus, the first authentication device can, based on the identifier obtained from the first mobile device, obtain information that indicates a first authentication technique and a second authentication technique with which the first authentication device can trigger at least two mobile devices associated with the person to authenticate the person. Upon determining that the person is authenticated using the at least two authentications, the first authentication device may display on a monitor or a screen a message that indicates that the person is authenticated. Thus, for example, another person in the mobile booth can allow the authenticated person to enter an area exclusively reserved for customers (e.g., VIP concert access, etc.).

In a second example of an authentication technique, a person carrying multiple smart devices approaches an area that includes a smart electronic lock or a smart garage door opener device with which the multiple smart devices can communicate to authenticate the person. For example, a first authentication device (e.g., smart electronic lock or a smart garage door opener device) located in a home can include a scanner device (e.g., a wireless transceiver) with which the first authentication device can determine whether that a first mobile device (e.g., a smart phone or RFID tag) is located within a scan area (e.g., wireless area) of the scanner device. If the first mobile device is determined to be present within the scan area of the scanner device, then the scanner device can wirelessly obtain an identifier from the first mobile device.

The authentication techniques employed by the first authentication device in this second example authentication technique can be the same or similar to the techniques described above for the first example authentication technique. Thus, the first authentication device can, based on the identifier obtained from the first mobile device, obtain information that indicates a first authentication technique and a second authentication technique with which the first authentication device can trigger at least two mobile devices associated with the person to authenticate the person. Upon determining that the person is authenticated using the at least two authentications, the first authentication device can cause a motor associated with the first authentication device to actuate to lock or unlock an electronic lock associated with the first authentication device, or the first authentication device can cause the motor associated with the first authentication device to actuate to open or close a garage door associated with the first authentication device. By performing authentication without interacting with or without alerting the person, the authentication techniques described in this patent document can facilitate seamless integration of multiple smart devices associated with the person for authentication while minimizing the extent to which the person interacts with his/her smart devices or is alerted of the authentication being performed with his/her smart devices.

FIG. 1 shows an example flowchart of a multi-factor authentication technique using at least two smart devices associated with a person being authenticated. At operation 202, an authentication module of a first authentication device (shown as 340 in FIG. 3) perform a first determination, using a scanner device, that a first mobile device associated with a person is located within a scan area of the scanner device. In some embodiments, the scanner device (shown as 350 in FIG. 3) may be a wireless transceiver that may be integrated into the first authentication device. The wireless transceiver can identify one or more mobile devices located within the wireless transmission/reception range of the wireless transceiver, and the wireless transceiver can provide to the authentication module communication related information about the one or more mobile devices to enable the authentication module to communicate with the one or more mobile devices. The communication related information may include, for example, the MAC address or another address with which the authentication module can send instruction to the one or more mobile devices located within the scan area of the wireless transceiver. Some examples of wireless transceivers include a Wi-Fi transceiver, a near field communication (NFC) transceiver, a RFID transceiver, or a Bluetooth transceiver.

At operation 204, the authentication module uses the scanner device to obtain a unique identifier from the first mobile device. The unique identifier may be an account identifier with which the authentication module can determine at least two authentications to use to authenticate the person. Thus, for example, the authentication module can send instruction to the first mobile device to request the unique identifier and the first mobile device can provide this information to the authentication module via the scanner device.

At operation 206, the authentication module sends the unique identifier to an authentication server. An identification module of the authentication server (shown as 440 in FIG. 4) can determine whether the unique identifier is associated with an account and if so, whether at least two authentication techniques are associated with the unique identifier. The person associated with the first device may previously register with the authentication server to provide information that can enable the identification module of the authentication server to identify at least two mobile devices associated with the person that can be used to authenticate the person. For example, a person may have previously created an account associated with the unique identifier in which the person may have indicated that he or she owns or carries a smart phone, a smart electronic watch, an RFID tag in his or her purse/wallet, etc., The identification module of the authentication server can register such smart devices and may communicate with them to ensure that such smart devices can communicate with other external devices.

Based on the information about the available smart devices associated with the unique identifier, the identification module of the authentication server can send to the first authentication device information that indicates a first authentication technique and a second authentication technique with which the person associated with the first mobile device is to be authenticated. In some embodiments, the information indicative of the first authentication technique can include, for example, a first identification of a smart phone (e.g., message that includes the term "iPhone" or "smart phone") and the information indicative the second authentication technique can include, for example, a second identification of a smart electronic glasses (e.g., message that includes the term "smart glasses"). In some embodiments, the information indicative of the first and second authentication techniques can include pre-determined values stored on the authentication server and the first authentication device, where the authentication module of the first authentication device can use, for example, two pre-determined values to determine what two types of authentication techniques are being identified by the authentication server. For example, a bit value of 0x0001 can be associated with authentication with a smart phone, a bit value of 0x0010 can be associated with authentication with smart glasses, a bit value of 0x0011 can be associated with 0x0100 can be associated with authentication with RFID tag, and so on. In some embodiments, the information indicative of the first and second authentication techniques can include address(es) of smart device(s) with which the authentication module of the first authentication device can communicate with the smart device(s).

At operation 208, the authentication module receives, from the authentication server, information that indicates the first authentication technique and the second authentication technique. The information that indicates the first and second authentication techniques are based on or associated with the unique identifier. The first authentication technique is different from the second authentication technique at least because two different smart devices are used to authenticate the person in some embodiments. The first authentication technique and the second authentication technique are configured to respectively trigger the first mobile device and a second mobile device to authenticate the person. The first mobile device and the second mobile device include any two of a smartphone, a smart watch, smart glasses, and a wearable device. For example, the first mobile device and the second mobile device may include two smartphones.

At operation 210, the authentication module performs a second determination that the person is authenticated by successfully performing the first authentication technique with the first mobile device and by successfully performing the second authentication technique with the second mobile device. In some embodiments, the authentication module can perform the first authentication technique by sending, to the first mobile device, a first instruction that triggers the first mobile device (e.g., smart phone) to play a first audio content at one or more frequencies and by sending, to the second mobile device, a second instruction that triggers the second mobile device (e.g., smart electronic watch) to play a second audio content at the one or more frequencies. The one or more frequencies may be greater than 20 kHz. In such embodiments, if the authentication module receives the first and the second audio contents via the microphone associated with the first authentication device (shown as 360 in FIG. 3), then the authentication module determines that the first and second authentication techniques have been successfully performed and that the person is authenticated. The first audio content may be the same as the second audio content or they may be different.

In some other embodiments, the second mobile device may be a biometric scanner that may be electrically and/or communicably coupled to the first authentication device. For example, a biometric canner can be a peripheral device that may be connected to the first authentication device via a USB cable. In such embodiments, the authentication module can perform the first authentication technique by sending, to the first mobile device, a first instruction that triggers the first mobile device to play an audio content and by receiving the audio content via a microphone associated with the first authentication device. The audio content may be a ringtone that may be selected by the authentication module of the first authentication device. The authentication module can perform the second authentication technique by receiving, from the second mobile device, biometric information about the person. In such embodiments, the authentication module determines that the person is authenticated if the authentication module determines that the received biometric information matches a previously stored biometric information of the person and if the authentication module receives the audio content played by the first mobile device, then the authentication. Biometric information may include a voice of the person, a facial image of the person, and/or fingerprint(s) of the person.

At operation 212, the authentication module can perform one or more of several final authentication operations in response to a successful authentication. For example, in response to performing the second determination that the person is authenticated, the authentication module can display on the first authentication device a message that indicates that the person is authenticated. In another example, in response to performing the second determination that the person is authenticated, if the first authentication device is or is included in an electronic lock, then the authentication module can send instruction to a motor in the electronic lock cause the motor to actuate to lock or unlock the electronic lock. In yet another example, in response to performing the second determination that the person is authenticated, if the first authentication device is or is included in a garage door opener device, then the authentication module can send instruction(s) to a motor associated with the garage door opener device to cause the motor to actuate to open or close a garage door.

Figure 2:
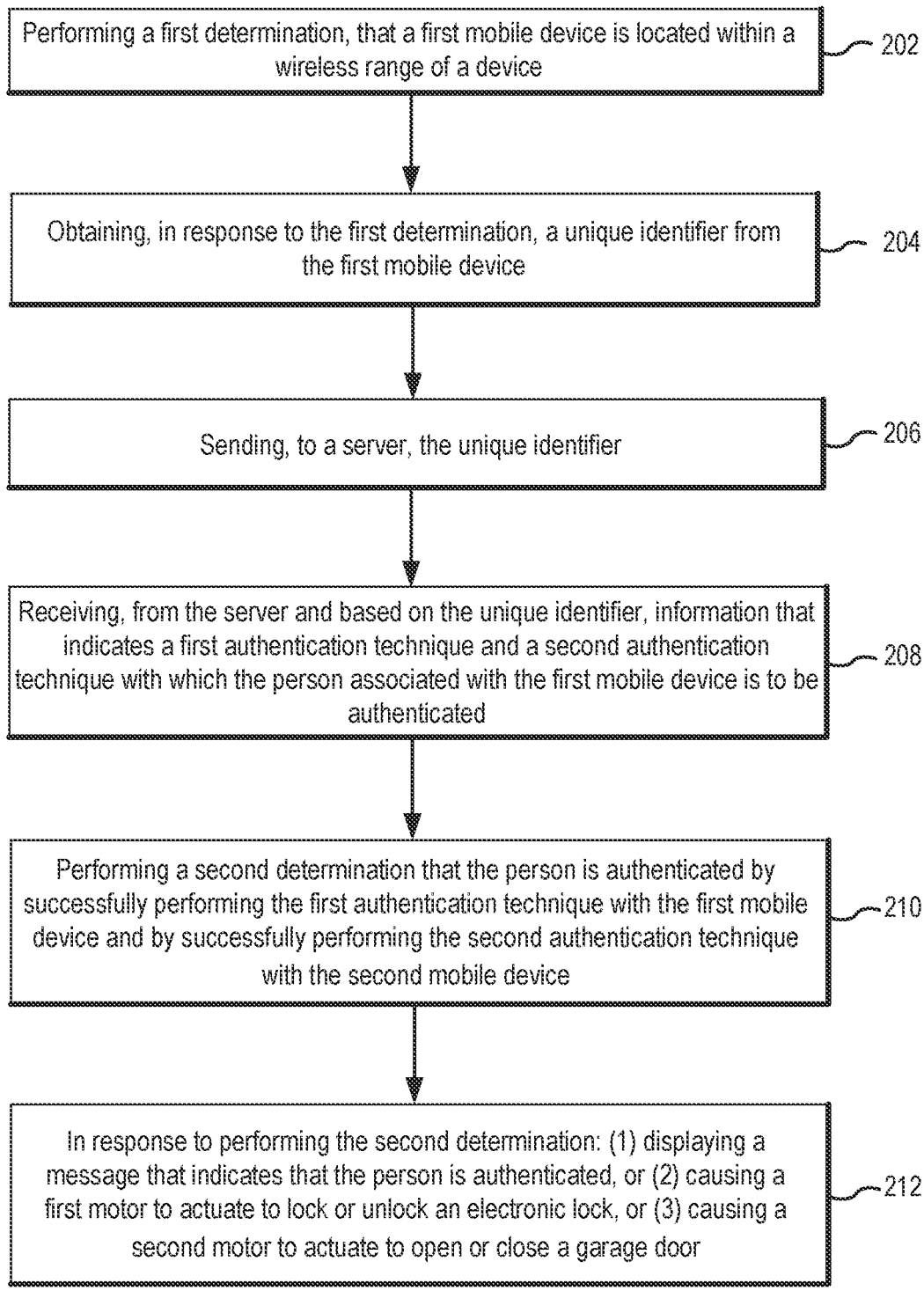
FIG. 2 shows an example flow diagram of a multi-factor authentication technique.

FIG. 2 shows an example flow diagram of a multi-factor authentication technique described in this patent document. At operation 302, the authentication module performs a first determination, that a first mobile device is located within a wireless range of a device, where the first mobile device is associated with a person. At operation 304, the authentication module obtains, in response to the first determination, a unique identifier from the first mobile device. At operation 306, the authentication module sends, to a server, the unique identifier. At operation 308, the authentication module receives, from the server and based on the unique identifier, information that indicates a first authentication technique and a second authentication technique with which the person associated with the first mobile device is to be authenticated, where the first authentication technique is different from the second authentication technique, and where the first authentication technique and the second authentication technique are configured to respectively trigger the first mobile device and a second mobile device to authenticate the person.

At operation 310, the authentication module performs a second determination that the person is authenticated by successfully performing the first authentication technique with the first mobile device and by successfully performing the second authentication technique with the second mobile device. At operation 312, the authentication module, in response to performing the second determination: displays a message that indicates that the person is authenticated, or causes a first motor to actuate to lock or unlock an electronic lock, or causes a second motor to actuate to open or close a garage door.

Figure 3:
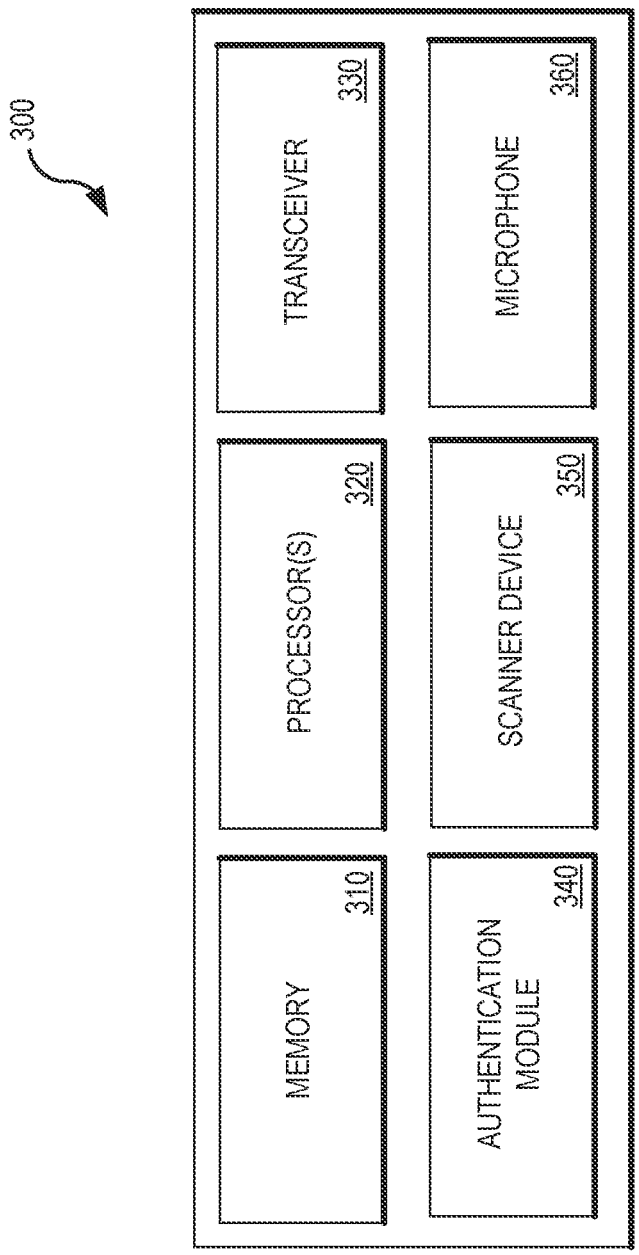
FIG. 3 shows a block diagram of a first authentication device.

FIG. 3 shows a block diagram of a first authentication device 300 operated to perform the multi-factor authentication techniques described in this patent document. The first authentication device 300 includes at least one processor 320 and a memory 310 having instructions stored thereupon. The instructions upon execution by the processor 320 configure the first authentication device 300 to perform the operations described in FIGS. 1 and 2 as described in this patent document.

Figure 4:
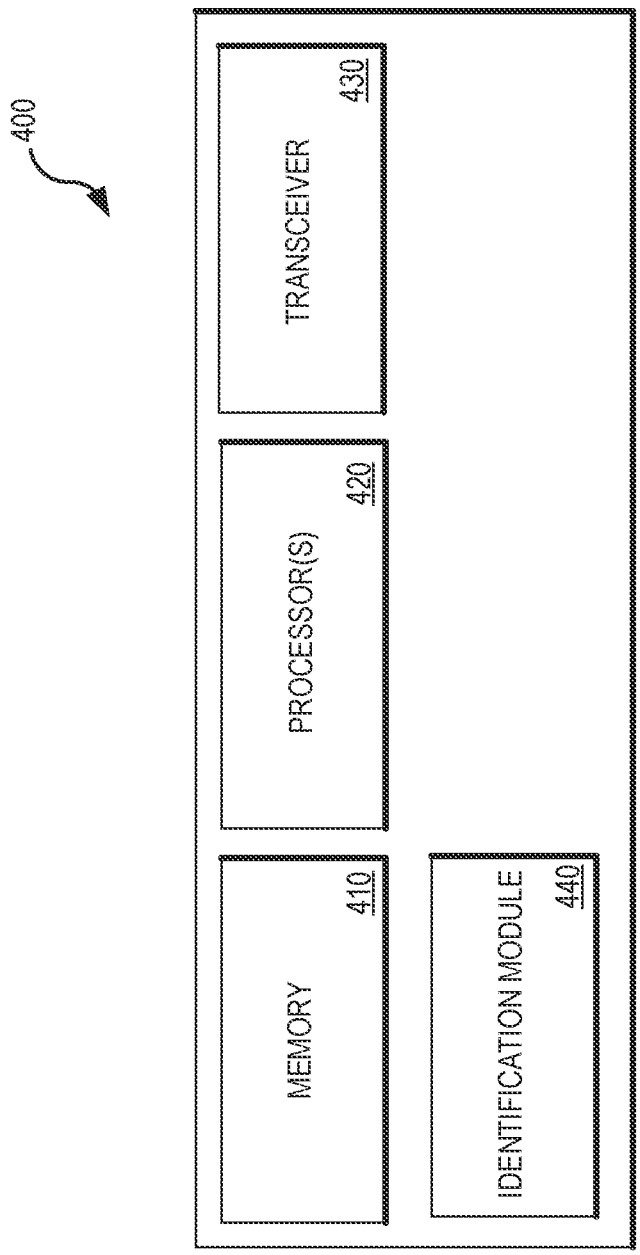
FIG. 4 shows a block diagram of an authentication server.

FIG. 4 shows a block diagram of an authentication server 400 operated to provide information to the first authentication device as described in this patent document. The authentication server 400 includes at least one processor 420 and a memory 410 having instructions stored thereupon. The instructions upon execution by the processor 420 configure the authentication server 400 to perform the operations described in FIGS. 1 and 2 as described in this patent document.

Figure 5:
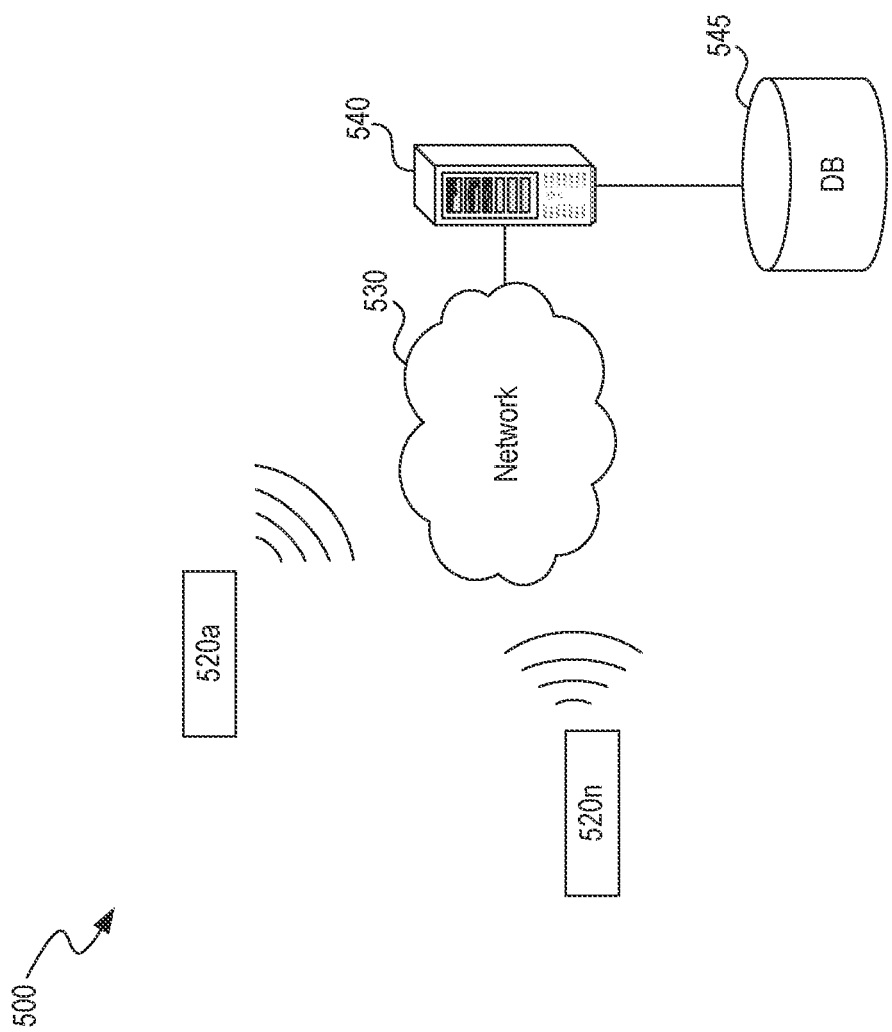
FIG. 5 shows an example multi-factor authentication system.

FIG. 5 shows an example multi-factor authentication system 500 where one or more first authentication devices 520*a* to 520*n* perform multi-factor authentication based on information provided by an authentication server 540 via a network 530 (e.g., Internet). A multi-factor authentication system 500 includes an authentication server 540 used by the first authentication devices to retrieve information about the types of authentication techniques that are associated with a unique identifier and that can be performed on the multiple devices carried by a person that is associated with the unique identifier. For each unique identifier, information indicative of the multiple types of authentication techniques can be stored on the database 545 so that the identification module of the authentication server 540 can retrieve such information from the database 545. The identification module can provide the information indicative of the multiple types of authentication techniques for a unique identifier to the first authentication device that provided the unique identifier.

In some embodiments, a non-transitory machine-readable medium having machine executable instructions stored thereon that, when executed by one or more processors, direct the one or more processors to perform a method as described in FIGS. 1 and 2.

Some implementations can be operational with numerous other general purpose or special purpose computing system environments or configurations Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIGS. 1-5 described above, and in each of the flow diagrams, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A, B; C, A and B; A and C; B and C; A, B, and C, or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A system for performing a multi-factor authentication, the system comprising: an authentication device comprising a processor configured to:
   perform a first determination, using a scanner device, that a first mobile device is located within a scan area of the scanner device, wherein the first mobile device is associated with a person;
   obtain, in response to the first determination and using the scanner device, a unique identifier from the first mobile device;
   send, to a server, the unique identifier;
   receive, from the server and based on the unique identifier, information that indicates a first authentication technique and a second authentication technique with which the person associated with the first mobile device is to be authenticated,
      wherein the first authentication technique and the second authentication technique are configured to respectively trigger the first mobile device and a second mobile device to authenticate the person;
   authenticate the person by:
      sending, to the first mobile device, a first instruction associated with the first authentication technique that triggers the first mobile device to play a first audio content;
      sending, to the second mobile device, a second instruction associated with the second authentication technique that triggers the second mobile device to play a second audio content; and
      determining that the person is authenticated based on detecting the first audio content and the second audio content via a microphone associated with the authentication device,
      wherein the person is authenticated based on the first mobile device, the second mobile device, and the authentication device being co-located; and
   in response to the authentication:
      display on the authentication device a message that indicates that the person is authenticated,
      cause a first motor associated with the authentication device to actuate to lock or unlock an electronic lock associated with the authentication device, or
      cause a second motor associated with the authentication device to actuate to open or close a garage door associated with the authentication device.

2. The system of claim 1, wherein the first instruction triggers the first mobile device to play the first audio content at one or more frequencies, the second instruction triggers the second mobile device to play the second audio content at the one or more frequencies, and the one or more frequencies are greater than 20 KHz.

3. The system of claim 1, wherein the first audio content is the same as the second audio content.

4. The system of claim 1, wherein the second mobile device comprises a biometric scanner communicably coupled to the authentication device, and wherein the processor is configured to successfully perform the authentication by being configured to:
   receive, from the second mobile device, biometric information about the person; and
   determine that the person is authenticated based on the received biometric information matching a previously stored biometric information of the person.

5. The system of claim 4, wherein the biometric information includes a voice of the person, a facial image of the person, or a fingerprint of the person.

6. The system of claim 1, wherein the information that indicates the first authentication technique includes a first identification of the first mobile device, and the information that indicates the second authentication technique includes a second identification of the second mobile device.

7. The system of claim 1, wherein the first mobile device and the second mobile device include any two of a smartphone, a smart watch, smart glasses, and a wearable device.

8. The system of claim 1, wherein the scanner device includes a wireless transceiver.

9. A method of multi-factor authentication, comprising:
   performing a first determination, that a first mobile device is located, within a wireless range of a device, wherein the first mobile device is associated with a person;
   obtaining, in response to the first determination, a unique identifier from the first mobile device;
   sending, to a server, the unique identifier;
   receiving, from the server and based on the unique identifier, information that indicates a first authentication technique and a second authentication technique with which the person associated with the first mobile device is to be authenticated,
      wherein the first authentication technique and the second authentication technique are configured to respectively trigger the first mobile device and a second mobile device to authenticate the person;
   authenticating the person by:
      sending, to the first mobile device, a first instruction associated with the first authentication technique that triggers the first mobile device to play a first audio content;
      sending, to the second mobile device, a second instruction associated with the second authentication technique that triggers the second mobile device to play a second audio content; and
      determining that the person is authenticated based on detecting the first audio content and the second audio content via a microphone associated with an authentication device, wherein the person is authenticated based on the first mobile device, the second mobile device, and the authentication device being co-located; and in response to performing the authenticating:
displaying a message that indicates that the person is authenticated, or causing a first motor to actuate to lock or unlock an electronic lock, or causing a second motor to actuate to open or close a garage door.

10. The method of claim 9, wherein the second mobile device comprises a biometric scanner, and wherein the successfully performing the authenticating includes:
receiving, from the second mobile device, biometric information about the person; and
determining that the person is authenticated based on the received biometric information matching a previously stored biometric information of the person.

11. The method of claim 10, wherein the biometric information includes a voice of the person, a facial image of the person, or a fingerprint of the person.

12. The method of claim 9, wherein the information that indicates the first authentication technique includes a first identification of the first mobile device, and the information that indicates the second authentication technique includes a second identification of the second mobile device.

13. A non-transitory machine-readable medium having machine executable instructions stored thereon that, when executed by one or more processors, direct the one or more processors to perform a method comprising:
performing a first determination, that a first mobile device is located within a wireless range of a device, wherein the first mobile device is associated with a person;
obtaining, in response to the first determination, a unique identifier from the first mobile device;
sending, to a server, the unique identifier;
receiving, from the server and based on the unique identifier, information that indicates a first authentication technique and a second authentication technique with which the person associated with the first mobile device is to be authenticated,
wherein the first authentication technique and the second authentication technique are configured to respectively trigger the first mobile device and a second mobile device to authenticate the person;
authenticating the person by:
sending, to the first mobile device, a first instruction associated with the first authentication technique that triggers the first mobile device to play a first audio content;
sending, to the second mobile device, a second instruction associated with the second authentication technique that triggers the second mobile device to play a second audio content; and
determining that the person is authenticated based on detecting the first audio content and the second audio content via a microphone associated with an authentication device,
wherein the person is authenticated based on the first mobile device, the second mobile device, and the authentication device being co-located; and
in response to performing the authenticating:
displaying a message that indicates that the person is authenticated, or causing a first motor to actuate to lock or unlock an electronic lock, or causing a second motor to actuate to open or close a garage door.

14. The non-transitory machine-readable medium of claim 13, wherein the information that indicates the first authentication technique includes a first identification of the first mobile device, and the information that indicates the second authentication technique includes a second identification of the second mobile device.

15. The non-transitory machine-readable medium of claim 13, wherein the first mobile device and the second mobile device include any two of a smartphone, a smart watch, smart glasses, and a wearable device.

16. The system of claim 1, wherein the first audio content is different from the second audio content.

17. The system of claim 16, wherein,
the first instruction triggers the first mobile device to play the first audio content at one or more frequencies, and
the second instruction triggers the second mobile device to play the second audio content at the one or more frequencies.

18. The method of claim 9, wherein the first audio content is different from the second audio content.

19. The system of claim 1, wherein the microphone is part of the authentication device, and the microphone is configured to detect the first audio content and the second audio content based on the first mobile device, the second mobile device, and the authentication device being co-located.

20. The system of claim 1, wherein the first mobile device comprises a smartphone and the second mobile device comprises a wearable device.

* * * * *